United States Patent [19]

Minarovic

[11] Patent Number: 4,947,012
[45] Date of Patent: Aug. 7, 1990

[54] ELECTROFUSION MARKER

[75] Inventor: Joe T. Minarovic, Austin, Tex.

[73] Assignee: Minnesota Mining and Manufacturing Company, St. Paul, Minn.

[21] Appl. No.: 354,466

[22] Filed: May 19, 1989

[51] Int. Cl.$^5$ .............................................. H05B 3/58
[52] U.S. Cl. ................... 219/535; 219/543; 324/326
[58] Field of Search ............... 219/535, 534, 544, 541, 219/548; 324/326–329; 156/272.2, 304.2, 379.6, 379.7

[56] References Cited

U.S. PATENT DOCUMENTS

| | | | |
|---|---|---|---|
| 4,119,908 | 10/1978 | Cosman et al. ........................ | 324/3 |
| 4,329,569 | 5/1982 | Hjortsberg ........................... | 219/543 |
| 4,334,227 | 6/1982 | Marks .................................. | 343/719 |
| 4,486,650 | 12/1984 | Bridgstock et al. ................. | 219/544 |
| 4,631,107 | 12/1986 | Ramsey ............................... | 219/535 |
| 4,712,094 | 11/1987 | Bolson, Sr. .......................... | 340/572 |

FOREIGN PATENT DOCUMENTS 993516  7/1976  Canada .................................. 324/48

Primary Examiner—Bruce A. Reynolds
Assistant Examiner—Leon K. Fuller
Attorney, Agent, or Firm—Donald M. Sell; Walter N. Kirn; Jack V. Musgrove

[57] ABSTRACT

An electrofusion marker which fuses two pipe sections together and acts as a passive electronic marker. The electrofusion marker includes a tubular thermoplastic fitting having a coil therein, which is temporarily energized by a power supply. This heats the fitting, causing it to fuse with the pipe sections. The coil doubles as an inductor, and a capacitor connected in parallel with the coil creates a resonant LC circuit. After the pipe sections have been fused together and buried the joint may be thereafter located by emitting a signal into the ground, which is picked up by the resonant circuit and re-radiated. The radiated signal is detected by a receiver, indicating location of the electrofusion marker and joint.

15 Claims, 1 Drawing Sheet

ELECTROFUSION MARKER

BACKGROUND OF THE INVENTION

1. Field of the Invention

The present invention generally relates to electronic markers, and more particularly to a fusion pipe coupler which doubles as an electronic marker for locating the buried pipe.

2. Description of the Prior Art

Buried conduits are employed for supplying a wide variety of utilities, including pipelines for gas, water and sewage, and cables for telephone, power and television. It often becomes necessary to locate defective or damaged cables, pipes, etc., in order to repair or replace them. Conversely, it is important to know the approximate vicinity of such items in order to avoid disturbing them when digging or excavating for other purposes.

Electronic marker systems for locating buried objects are known in the art, and generally consists of two types, namely, active and passive markers. Active markers require the use of a power supply which amplifies a signal source (usually an AC signal). The signal is radiated by the underground marker and detected by a receiver unit above ground. Passive markers, in contrast, have no power supply, but rather operate in a resonant mode, responsive to a transmitted electromagnetic field.

A passive marker is basically a wire coil and capacitor surrounded in a protective envelope, which is then buried adjacent to the cable, pipe, or other object to be located. The marker is self-contained, with no external, accessible connections. Minnesota Mining & Manufacturing Co. (assignee of the present invention) markets several kinds of passive markers for different applications as part of its ScotchMark Electronic Marker System ("ScotchMark" is a registered trademark of 3M). Two such passive markers are described in U.S. Pat. Nos. 4,334,227 issued to B. Marks on June 8, 1982, and U.S. Pat. No. 4,712,094 issued to J. Bolson on Dec. 8, 1987, each of which are hereby incorporated by reference.

Passive markers are activated by radiating a signal into the ground in the area where the marker is expected to be found. The signal is emitted via an inductive coil held close to the surface. When the coil is directly over, or near, the passive marker (which is itself an inductive coil), the marker accepts energy within its bandpass and stores it, reaching a sustained amplitude during the transmission cycle. When the transmission cycle ends, the marker re-emits the signal with an exponentially decaying amplitude. A second coil within the transceiver unit acts as a receiving antenna which detects the reradiated signal, alerting the service technician with an audible tone or other indicator means. A good explanation of one such transmitter/receiver device may be found in Canadian Patent No. 993,516, which is based on a U.S. patent application, Ser. No. 523,263 (filed Nov. 13, 1974), now abandoned. A related method is disclosed in U.S. Pat. No. 4,119,908 issued to Cosman et al. on Oct. 10, 1978.

Passive markers are usually color-coded according to the particular type of utility line they mark. Specifically, gas line markers are yellow; telephone cable markers are orange; waste water tunnel markers are green; water pipe markers are blue; and power supply markers are red. Similarly, the passive marker is "coded" by tuning the coil for a specific resonant frequency. Five distinct frequencies have been designated: 83.0 kHz for gas; 101.4 kHz for telephone; 121.6 kHz for sewage; 145.7 kHz for water; and 169.8 kHz for power. In this manner, a service technician searching for, say, a gas line, cannot accidentally activate a telephone marker since his transmitter will only be sending out an 83 kHz signal, which is not within the bandwidth for a telephone marker tuned for 101.4 kHz. Of course, these frequencies have been designated by convention, and are not meant to be restrictive.

Another technical area which is relevant to the present invention, but heretofore has been unrelated to electronic markers, pertains to the coupling of two plastic pipes or conduits. When underground pipes are being laid (for sewage, gas, etc.), they must be joined in a manner which precludes leakage at the joint. Similarly, it is often necessary to repair breaks in the pipe which result in leaks. One technique for fitting the pipes together involves the use of electro-fusion couplers.

An electro-fusion coupler is a thermoplastic fitting which is designed to join the ends of two conduits. The coupler contains an electrical resistance heating element which, upon energization, raises the temperature of the thermoplastic material, causing it to flow about the conduits, thereby fusing them together. One example of an electro-fusion coupler is shown in U.S. Pat. No. 4,486,650 issued to Bridgstock et al. on Dec. 4, 1984, which is hereby incorporated by reference.

When pipe is being laid, or being repaired, it becomes convenient to situate a marker in the hole or ditch in which the pipe is laid. It would, however, be desirable and advantageous to devise an apparatus which would simultaneously fuse the pipes together and provide an electronic marker, thereby saving time and avoiding the need for two separate devices.

Accordingly, the primary object of the present invention is to provide an electronic marker for buried conduits.

Another object of the invention is to provide an electro-fusion coupler having an integral electronic marker.

Still another object of the invention is t provide such a device which may be coded for use as a marker for a particular utility.

Yet another object of the invention is to provide an apparatus which may be used with existing electrofusion couplers in order to convert them into electronic markers.

SUMMARY OF THE INVENTION

The foregoing objects are achieved in an electrofusion marker comprising a thermoplastic fitting, a heating element, and means connected to the heating element for creating a resonant circuit. The electrofusion marker has a coil therein used as the heating element, which also has inductive characteristics. A capacitor connected to the heating coil creates a resonant LC circuit which may be activated by an external transmitter. By proper selection of the value of the capacitor, to complement the effective inductance of the heating element, a tuned circuit is also created.

BRIEF DESCRIPTION OF THE DRAWINGS

The novel features of the invention are set forth in the appended claims. The invention itself, however, will best be understood by reference to the accompanying drawings, wherein:

FIGS. 4A and 4B are perspective views showing placement of the electrofusion marker on a

DESCRIPTION OF THE PREFERRED EMBODIMENT

Figure 1:
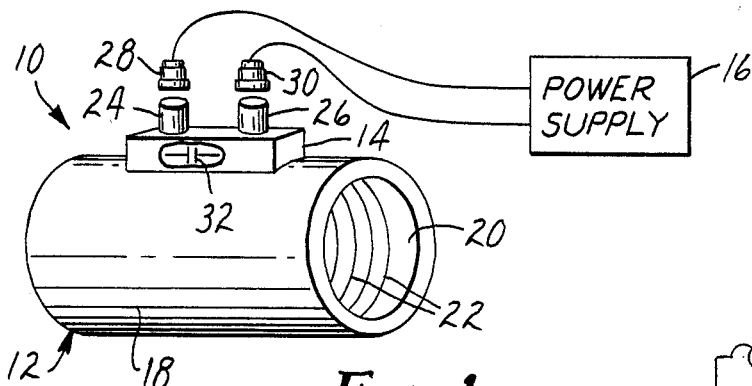
FIG. 1 is a perspective view of the electrofusion present invention.

With reference now to the figures, and in particular with reference to FIG. 1, there is depicted an electrofusion marker lo of the present invention. Electrofusion marker 10 is generally comprised of a tubular thermoplastic fitting 12, connector block 14, and power supply 16. Thermoplastic fitting 12 is constructed of any thermoplastic material, i.e., a polymeric resin which softens when heated, such as polyethylene. Alternatively, the outer body 18 of fitting 12 may be a non-plastic material (preferably non-magnetic), with only the inner wall 20 being thermoplastic.

Fitting 12 has along its inner wall 20 a winding of wire forming a coil 22, the wire being coated with or imbedded in a thermoplastic material. The two ends of coil 22 terminate in connector block 14 as described below. Coil 22 is preferably a COpper wire and functions both as a resistor and an inductor. The resistance of the wire should be sufficient to heat fitting 12 so as to provide plastic flow. The geometry of coil 22 is selected to give an optimum "Q" (energy dissipation factor) for marker 10, and varies according to the diameter and length of fitting 12.

The size of fitting 12 is variable as different diameters are necessary for the various pipes to be joined. The diameter of fitting 12 may accordingly vary from as little as five centimeters to several meters. Also, fitting 12 is not necessarily cylindrical, as its inner cavity is designed to mate with existing conduits. Inasmuch as most conduits are cylindrical, however, the cross-section of fitting 12 is typically circular, although it may also be C-shaped. More information on electrofusion couplers may be had by reference to the American Society for Testing and Materials (ASTM) standard F1055, hereby incorporated by reference.

Connector block 14 is preferably molded integrally with fitting 12, and includes two terminals 24 and 26 having electrical contacts which are connected, respectively, to the two ends of coil 22. Terminals 24 and 26 are designed to mate with sockets 28 and 30 of power supply 16. A capacitor (reactor) 32 is also provided between terminals 24 and 26, in parallel with coil 22. The corresponding electrical circuit is shown schematically in FIG. 2. Power supply 16 is essentially an AC voltage source. Further details of, and improvements to, power supply 16, as well as fitting 12 and connector block 14, are disclosed in U.S. Pat. No. 4,486,650, to which the reader is directed.

Figure 2:
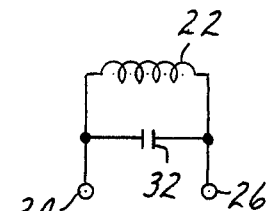
FIG. 2 is a schematic representation of the electrical of the electrofusion marker.

By providing a capacitor (absent in prior art electrofusion couplers) in parallel with coil 22, an LC circuit is formed which may advantageously be utilized after the fitting 12 has fused two pipe ends together. As those skilled in the art will appreciate, the LC circuit shown in FIG. 2 is a resonant circuit with an optimum frequency f given by the equation $$f = \frac{1}{2\pi\sqrt{LC}},$$

where L is the effective inductance of coil 22 and C is the capacitance of capacitor 32.

With proper selection of the capacitance of capacitor 32 (and knowing the effective inductance of coil 22), electrofusion marker 10 may be made to resonant at any one of the conventional frequencies listed above in the Description of the Prior Art. Capacitor 32 should have a sufficiently high voltage rating to avoid breakdown during energization of coil 22 by power supply 16. Also, some coils may haVe very few turns, necessitating a relatively large capacitance for resonance. A capacitor should be chosen which has a low equivalent series resistance (ESR) as this will affect the Q of the circuit.

Figure 3:
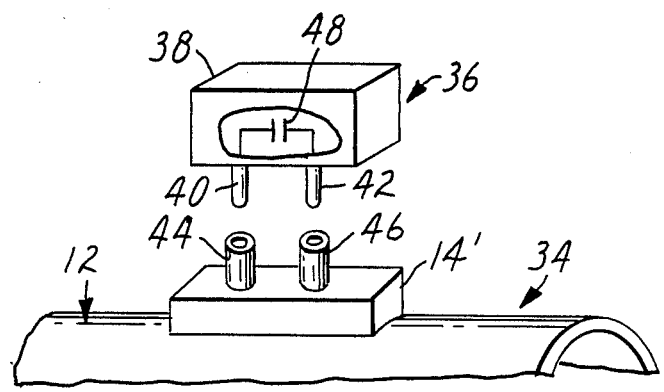
FIG. 3 is a perspective view showing use of a capacitive adapter with an existing electrofusion coupler.

Referring now to FIG. 3, an existing electro-fusion coupler 34 may be retrofitted with a suitable adapter 36 in order to impart electronic marking ability. Adapter 36 is generally comprised of a housing 38 having two plugs 40 and 42, designed to mate With terminals 44 and 46, respectively, of coupler 34. A capacitor 48 inside housing 38 is connected to plugs 40 and 42. In this manner, adaptor 36 may be attached to the prior art electrofusion coupler 34 after it has been energized (fusing the two pipe sections together). Additional means may be provided for securing adaptor 36 to coupler 34, i.e., a clasp or snap-lock (not shown).

Electrofusion marker 10, as well as adaptor 36, may be color coded based on the particular utility they are to be associated with, in accordance with industry convention. Presently, the following colors are used: red—electric utility; yellow—gas; blue —water; green—sewage; and orange—telephone. Adapters may be further identified with a code number or other indicia designating the type of prior art coupler it is designed for. In other words, the capacitor within an adapter of a given color (i.e., designed to yield a specific resonant frequency) will actually have a different capacitance from a capacitor in another adapter of the *same* color, due to the different inductances of the various sized couplers.

Figure 4A:
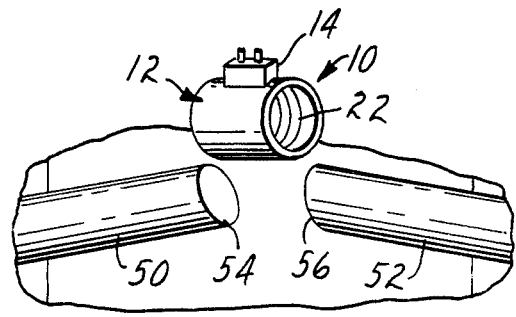
Figure 4B:
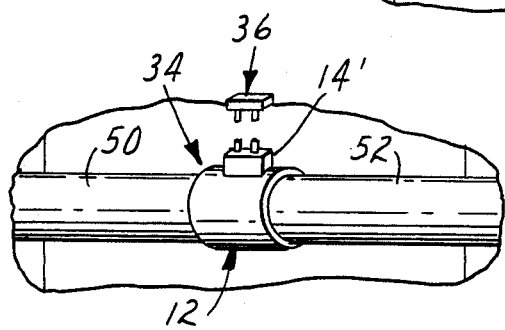

Operation of electrofusion marker 10 is straightforward, and is illustrated in FIGS. 4A and 4B. After elongated members (pipe sections) 50 and 52 have been laid (or a leak in the pipe located and exposed), electrofusion marker 10 is fitted between the two pipe ends 54 and 56. The power supply 16 is connected to connector block 14 of marker and energized, fusing the two ends 54 and 56 together. Power supply 16 is disconnected, and the pipe section buried. A protective cap (not shown) may be used before burial to cover connector block 14 and prevent environmental damage to the electrical components of marker 10. When using prior art couplers, the normal procedure is followed for fusing the pipe together. Then, as shown in FIG. 4B, the adaptor 36 is placed on connector block 14. In this situation, adaptor 36 doubles as a protective cover, and may be provided with sealing material at the base of plugs 40 and 42 to prevent corrosive elements from reaching capacitor 32 or coil 22.

Once marker 10 (or adaptor 34) is in place, it may be detected by use of a locating device, such as those disclosed in U.S. Pat. No. 4,119,908 and Canadian Patent No. 993,516. When an AC signal (at the resonant frequency of marker 10) is emitted in the direction of marker 10, the LC circuit will begin to absorb and re-radiate the signal. The re-radiated signal is then detected by the receiver portion of the locating device, which alerts the technician to the proximity of the marker. Inasmuch as pipe sections are commonly laid down every forty feet or so, a series of markers 10 (or prior art couplers with adapters) may advantageously allow tracing of the pipe over long distances.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the electrofusion marker could be constructed in a T-shape to connect three pipes coming together in a T-fashion, or a marker could be used as an end cap. Also, the fitting may be constructed of heat-shrinkable material, rather than a thermoplastic. It is therefore contemplated that the appended claims will cover such modifications that fall within the true scope of the invention.

I claim:

1. A device for coupling two elongated members and electronically marking the coupled joint, comprising:
   a hollow, thermoplastic fitting member having an inner wall;
   resistance means for heating said fitting member when said resistance means is connected to an external power supply, whereby said fitting member becomes fused around the elongated members; and
   means connected to said resistance means for creating a resonant circuit.

2. The device of claim 1 wherein said resistance means comprises coil means attached to said fitting member proximate said inner wall thereof.

3. The device of claim 2 wherein said means for creating a resonant circuit comprises reactor means electrically connected in parallel with said coil means.

4. The device of claim 3 wherein said reactor means comprises a capacitor, and said resonant circuit has a resonant frequency f given by the equation $$f = \frac{1}{2\pi\sqrt{LC}},$$

where L is the inductance of said coil means and C is the capacitance of said capacitor.

5. The device of claim 4 wherein:
   said coil means comprises a coil of electrically conductive wire having first and second ends; and
   said fitting member has attached thereto first and second terminals for receiving sockets of the external power supply, said first and second ends of said coil being connected to said first and second terminals, respectively.

6. The device of claim 5 wherein said inner wall of said thermoplastic fitting member has a cross-section essentially identical to the cross-section of the elongated members.

7. The device of claim 6 wherein said thermoplastic fitting member is constructed of polyethylene.

8. The device of claim 4 wherein said thermoplastic fitting member is color coded to indicate the resonant frequency f of said resonant circuit.

9. An electrofusion marker for coupling two pipes and electronically marking the coupled joint, comprising:
   a tubular, thermoplastic fitting having an inner wall, an outer surface, and first and second terminals attached to said outer surface;
   a coil of electrically conductive wire having first and second ends, said coil being attached to said fitting proximate said inner wall thereof, and said first and second ends of said coil being electrically connected to said first and second terminals, respectively; and
   reactor means connected in parallel to said coil for creating a resonant circuit.

10. The electrofusion marker of claim 9 wherein said reactor means comprises a capacitor, and said resonant circuit has a resonant frequency f given by the equation $$f = \frac{1}{2\pi\sqrt{LC}},$$

where L is the inductance of said coil and C is the capacitance of said capacitor.

11. The electrofusion marker of claim 10 wherein:
   said inner wall of said thermoplastic fitting has a circular cross-section essentially identical to the cross-section of the pipes; and
   said fitting is constructed of polyethylene.

12. The electrofusion marker of claim 11 further comprising power supply means for temporarily energizing said coil, whereby said fitting may be heated and become fused around the pipes, said power supply means having first and second sockets for connection to said first and second terminals of said fitting, respectively.

13. The electrofusion marker of claim 12 wherein said thermoplastic fitting is color coded to indicate the resonant frequency f of said resonant circuit.

14. An adaptor for modifying a tubular electro-fusion coupler into an electronic marker, the electrofusion coupler having first and second terminals connected to first and second ends of a coil within the coupler, comprising:
   a housing;
   first and second plugs attached to said housing, for mating with the first and second terminals of the coupler; and
   a capacitor located within said housing, electrically connected between said first and second plugs whereby, when said plugs are united with said terminals, a resonant LC circuit is created.

15. The adaptor of claim 14 further comprising means for sealing the connection between said plugs and the terminals of the coupler.

* * * * *

UNITED STATES PATENT AND TRADEMARK OFFICE
CERTIFICATE OF CORRECTION

PATENT NO. : 4,947,012
DATED : August 7, 1990
INVENTOR(S) : Joe T. Minarovic

It is certified that error appears in the above-identified patent and that said Letters Patent is hereby corrected as shown below:

Column 3, Line 1, "electrofusion present invention." should read --electrofusion marker of the present invention.--

Column 3, Line 4, "electrical of the" should read --electrical circuitry of the--

Column 3, Line 9, "marker on a" should read --marker on a buried conduit.--

Column 3, Line 15, "marker lo" should read --marker 10--

Column 3, Line 28, "COpper" should read --copper--

Column 4, Line 14, "haVe" should read --have--

Column 4, Line 23, "With" should read --with--

Column 4, Line 50, "14 of marker" should read --14 of marker 10--

Signed and Sealed this

Twenty-fifth Day of February, 1992

Attest:

HARRY F. MANBECK, JR.

*Attesting Officer*  *Commissioner of Patents and Trademarks*